S. O. HAHN.
METHOD OF TREATING LEATHER.
APPLICATION FILED FEB. 16, 1920.
1,369,240.　　　　　　　　　　　　Patented Feb. 22, 1921.
Fig. I.
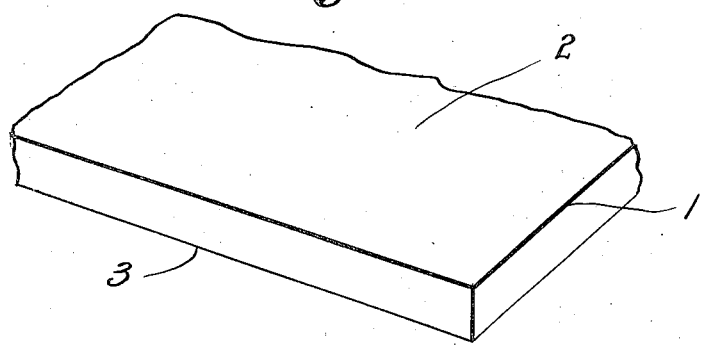
Fig. II.
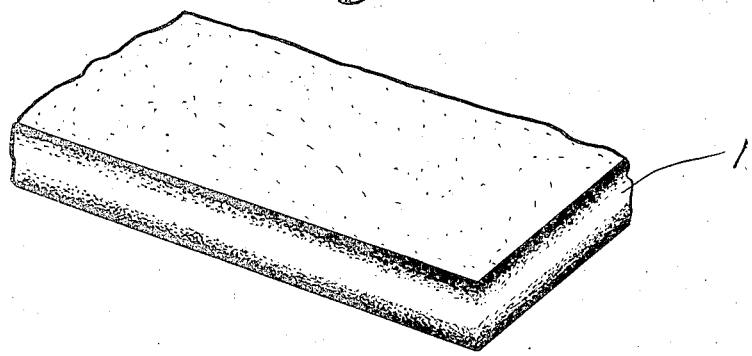
Fig. III.
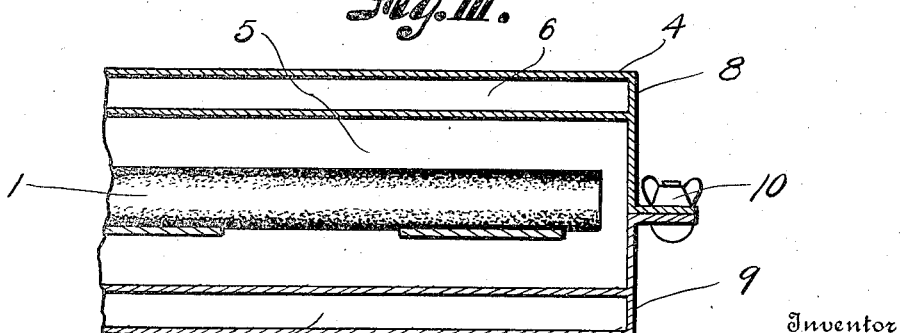
Inventor
Samuel Otis Hahn.
By Arthur C. Brown
Attorney

UNITED STATES PATENT OFFICE.

SAMUEL OTIS HAHN, OF LINCOLN, NEBRASKA, ASSIGNOR TO THE CHROME LEATHER AND RUBBER TIRE COMPANY, INC., OF PUEBLO, COLORADO.

METHOD OF TREATING LEATHER.

1,369,240.  Specification of Letters Patent.  Patented Feb. 22, 1921.

Application filed February 16, 1920. Serial No. 359,186.

*To all whom it may concern:*

Be it known that I, SAMUEL OTIS HAHN, a citizen of the United States, residing at Lincoln, in the county of Lancaster and State of Nebraska, have invented certain new and useful Improvements in Methods of Treating Leather; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a method of preparing leather to receive a vulcanized coating of rubber to provide articles for industrial purposes, such as belts, sheets, soles, rubber tires, insoles and the like, the primary object of the invention being to prepare the leather with an adhesive surface adapted to combine with the rubber to be vulcanized thereon in such manner that the rubber and leather will be in effect an integral mass.

According to my invention the leather may be so effectually prepared that when the vulcanized coating or layer of rubber is applied thereto, it can only with difficulty be removed and the method is such that the natural characteristics of the leather will not be impaired during the process.

As an example of my invention I prefer to use chrome leather or cowhide of appropriate thickness and impregnate the body of leather to a suitable degree beyond the surface or surfaces with rubber cement, having a relatively low sulfur content.

I have also taken ordinary commercial rubber cement and permitted the same to stand a sufficient time to allow natural precipitation of the sulfur and then used the material above the precipitation containing whatever sulfur remained therein, and I have found that this admirably serves the purpose intended.

The chrome leather may be treated on one or both sides by rubbing the low sulfur content cement thoroughly into the surface or surfaces thereof and then allowing the leather thus treated to stand for a period of approximately one-half hour at normal temperature to permit the cement to set; i. e., permit the volatile filler to evaporate and leave the adhesive content of the cement as a surface.

In order to get the best results, the treatment just described should be repeated about three times, allowing thirty minutes after each application of the cement, whereupon the leather is in condition to receive the vulcanizing coating or layer.

After the leather is treated as above described, the vulcanizing sheet or layer of rubber may be applied to the surface thereof and the sheet of treated leather and sheet or sheets of rubber to be vulcanized thereto may be subjected to a vulcanizing treatment consisting of application of dry heat. The time required to cure or vulcanize the rubber on the leather so treated will depend upon the quality or character of the rubber used but usually about two hours treatment at 280° F., under pressure, will be sufficient to accomplish the desired result.

Chrome leather or cowhide has considerable tensile strength but so far as I am aware, it has been considered to be impractical before my invention to vulcanize rubber thereto, due to the inability to cause the rubber to combine at the surface with the leather so that the requisite bond might be effected. By treating the leather in the manner described, the natural characteristics of the leather are in no way impaired as the treatment does not char the leather or cause it to lose its inherent flexibility or crack when subjected to twisting or bending, and by applying the sizing or bond consisting of the low sulfur content cement to the leather in the manner described, the leather is prepared so that it has an affinity for the rubber sheet to be vulcanized thereto, the bond being held by the leather and the rubber vulcanized sheet combining with the cement so that in effect an integral structure is provided, consisting of the flexible rubber and the vulcanized sheet.

If the leather is impregnated with low sulfur content cement on both sides and then the surfaces are covered with sheets of rubber or rubberized fabric, as described, an efficient, durable and exceedingly flexible product will be provided, consisting of a core or inner layer of the leather with outer sheathings of rubber, the whole being in effect an integral mass.

Under some conditions it is advisable to vulcanize only one side of the leather as, for example, where the leather is the insole of a leather shoe or boot. This is of prime importance in the manufacture of rubber boots inasmuch as it enables the manufacturer to provide a rubber boot capable of excluding water and moisture but permitting an inner sole of leather to be in effect an integral part of the outer sole so that the wearer's foot will come in contact with the leather only and not be subjected to the inconveniences incident to contact of rubber with the foot.

The uses to which the finished products may be placed are too multitudinous to enumerate but it will be apparent that the products will be adapted for use in connection with belts, tires, flexible sheetings of various kinds, utensils, boots and shoes, etc.
In the drawings, Figure I is a perspective view of a sheet of leather previous to being treated.

Fig. II is a similar view, showing the leather impregnated with the cement, and Fig. III is a sectional view through a curing machine or drier into which the finished sheet may be placed for curing.

The sheet 1 is shown as consisting of a piece of leather of appropriate thickness, adapted to have its surfaces, either 2 or 3 or both, impregnated with the cement, preferably of low sulfur content, above specified, in the manner described heretofore, and after each application of the cement, which should be thoroughly applied by rubbing or similar action, the sheet of leather so treated is exposed to the air to permit the cement to set. By virtue of the said rubbing or similar action in the application of the cement to the leather, the pressure incident to the rubbing forces the cement into a portion of the body of the leather beyond the surface of the leather. When the sheet so treated is in proper condition, it is subjected to a dry heat in the curing device 4, conventionally shown as having a receiving chamber 5 and parallel heat conduits 6 and 7. The treating device consists of two parts 8 and 9, fastened together by fastening devices 10. The particular form of device is unimportant as any device for holding the product under pressure while dry heat is applied thereto may be used. The manner of application of dry heat to the product is also unimportant except that the heat must be applied uniformly to all surfaces or parts to be vulcanized.

After sheets of leather and rubber applied thereto have been prepared as described, any number of layers of the combined material may be caused to adhere one to the other by the cement so that the structure may be built up for any number of layers desired, provided there is a sufficient body of rubber between layers to form the adhesion.

Tread or the like may be treated in the usual manner but steam must not be used in vulcanizing to the leather sheet.

In actual practice I have found that this treatment does not impair the quality or characteristics of the leather in any manner. The leather remains flexible and pliable and adequately adheres to the coating vulcanized upon it.

What I claim and desire to secure by Letters-Patent is:

1. The method of treating leather which consists in separating from ordinary commercial rubber cement a portion of the sulfur thereof to produce a cement of a decidedly lower sulfur content than the ordinary commercial rubber cement, then forcing the residue into the body beyond the surface of the latter to impregnate the leather and subsequently vulcanizing rubber to the leather so treated whereby the rubber and leather are united into substantially an integral mass.

2. The method of treating leather which consists in forcing rubber cement of a decidedly lower sulfur content than ordinary commercial rubber cement into the body of chrome leather a suitable degree beyond the surface of the latter to thoroughly impregnate the body of the leather with the gum constituent of the cement and subsequently vulcanizing rubber to the leather so treated whereby the rubber, leather and cement are united into substantially an integral mass.

In testimony whereof I affix my signature.

SAMUEL OTIS HAHN.